United States Patent [19]
Faulkner

[11] 3,868,429
[45] Feb. 25, 1975

[54] SEPARATION OF XYLENES

[75] Inventor: William Donald Faulkner, Pittsburgh, Pa.

[73] Assignee: Calgon Corporation, Pittsburg, Pa.

[22] Filed: Nov. 1, 1972

[21] Appl. No.: 302,833

[52] U.S. Cl............ 260/674 SA, 208/300, 208/310, 252/444, 210/30, 210/39
[51] Int. Cl.............................................. C07c 7/12
[58] Field of Search ....... 260/674 SA; 208/300, 307

[56] References Cited
UNITED STATES PATENTS

| | | | |
|---|---|---|---|
| 2,518,236 | 8/1950 | Hirschler | 260/674 |
| 2,653,175 | 9/1953 | Davis | 260/674 |
| 2,944,031 | 7/1960 | Mason | 252/421 |
| 3,133,126 | 5/1964 | Fleck et al. | 260/674 |
| 3,222,412 | 12/1965 | Mason et al. | 260/674 |
| 3,342,555 | 9/1967 | McMillan | 252/444 |
| 3,395,094 | 7/1968 | Weisz | 208/62 |
| 3,457,166 | 7/1969 | Haufe et al. | 208/307 |
| 3,516,791 | 6/1970 | Evans et al. | 252/421 |

*Primary Examiner*—Delbert E. Gantz
*Assistant Examiner*—C. E. Spresser
*Attorney, Agent, or Firm*—Harry E. Westlake, Jr.; Raymond M. Speer

[57] ABSTRACT

Activated carbon having a controlled pore size is used as a molecular screening device to separate xylenes. The paraxylene tends to be concentrated in the carbon while the meta and ortho forms tend to be excluded. Certain solvents affecting the efficiency of the process are discussed.

3 Claims, No Drawings

SEPARATION OF XYLENES

BACKGROUND OF THE INVENTION

It has been known for some time to separate the isomers of xylene by various methods such as low temperature cyrstallization, fractional distillation, selective sulfonation and subsequent hydrolysis, selective solvent separation, and others. More recently, the demand has increased for paraxylene, which is a precursor of polyethylene terephthalate, and the use of crystalline zeolitic molecular sieves has been proposed for its isolation from the isomers. See Belgian Pat. No. 754,754 and U.S. Pat. Nos. 3,558,730 and 3,558,732. The use of zeolitic cyrstalline molecular sieves has also been proposed for the separation of cresols (U.S. Pat. Nos. 3,014,078) and certain halogenated aromatics (U.S. Pat. No. 2,958,708). See also British Pat. No. 902,724, and U.S. Pat. No. 3,437,590. Paraxylene has been concentrated from its isomers by a molecular sieve adsorption process disclosed in U.S. Pat. No. 3,126,425. Other publications of interest to the reader are South African Pat. No. 7,007,856, French Pat. No. 2,058,006, and German Pat. No. 2,146,214. The pore size and pore structure of such zeolites, which usually contain aluminate and silicate, have been thoroughly studied in the literature. See, for example, the review of the art as it stood in 1956 as recited in U.S. Pat. No. 2,866,835. Zeolitic molecular sieves having pore sizes between about 10 and about 15 angstroms have been used for separations of molecules having high molecular weights, such as paraffin waxes. See U.S. Pat. No. 2,924,567. Using a different process, wherein a particular temperature and flow rate is controlled, a 5 angstrom molecular sieve has been used to remove paraffins as wax constituents from petroleum mixtures. On the other hand, synthetic molecular sieves having pore openings of about 4 angstroms have been used to remove odorous compounds from a paraffin hydrocarbon fraction. See U.S. Pat. No. 3,080,436; this is an example of the selectivity possible with molecular sieve technology.

Normal and branched chain olefins have been separated by synthetic and natural molecular sieves; see U.S. Pat. No. 3,146,277 and U.S. pat. No. 3,242,641. Waxy straight-chain hydrocarbons have also been removed from mineral oil mixtures in a molecular sieve system which is described in detail in U.S. Pat. No. 3,258,417. The separation of butylene and isobutylene has also been accomplished through the use of synthetic and natural molecular sieves having particular pore opening measurement. See U.S. Pat. Nos. 2,894,998, 3,061,654 and 3,151,178. Other patents of interest in the general area of the use of molecular sieve adsorbents to separate hydrocarbon streams include U.S. Pat. Nos. 3,278,624, 3,360,582, and 3,524,895.

The natural molecular sieves which have been found to be useful for selective adsorption or other selective separation of materials including hydrocarbons include chabazite, mordenite, erionite, faujasite, and gismondite. The natural zeolites are thoroughly discussed by Charles K. Hersh in chapter three of his book entitled "Molecular Sieves," (Reinhold, New York 1961). The natural molecular sieves generally contain large amounts of aluminum silicates and also may contain other metals such as sodium, barium, calcium, and potassium. The natural molecular sieves or zeolites are hydrophilic and generally may act as ion exchange materials. The pore openings are of various regular shapes, determined by the configuration of the crystals; the crystal forms may be cubic, hexagonal, rhombohedral, tetragonal, orthorhombic, etc. The cubic natural zeolitic minerals are known to adsorb normal paraffins and exclude isoparaffins; see Britich Pat. No. 548,905 and the U.S. Pat. No. 2,306,610. The zeolite molecular sieves known to be capable of adsorbing normal hydrocarbons such as chabazite have been analyzed as having pore openings of about 4.8 angstroms.

Commercial synthetic alumino silicate molecular sieves have also been available for a number of years and are well known in the art. See U.S. pat. No. 2,882,243, and 2,882,244. The synthetic molecular sieves are generally used for adsorbing water from hydrocarbon fuels and other materials, and for purposes employing at least one of the following characteristics. In contrast to most conventional adsorbents, the synthetic molecular sieves will adsorb small molecules in preference to large molecules. A particular adsorbate may be removed from a mixture or solution in which it is a very small component or a major constituent. In some applications, the excellent affinity of synthetic zeolites for unsaturated organics is of use. Also in some applications, the affinity of the natural zeolites for polar molecules can be utilized.

Several major disadvantages to the synthetic and natural molecular sieves have been observed. For example, there are certain limitations as to the materials which may be used for regeneration of synthetic or natural zeolitic molecular sieves. Water, for example, may be injurious to the zeolitic molecular sieve. It is generally recommended that a gas be used for regeneration of zeolitic molecular sieves. In dessicant applications, the object of regeneration will be to remove the water from the molecular structure which may be difficult to do without altering the structure of the sieve. Activated carbon avoids disadvantages such as these, and in addition has many advantages.

Activated carbon has not, to my knowledge, been used in a process for xylene separation in a manner comparable to the method of use of a molecular sieve.

SUMMARY OF THE INVENTION

I have found that certain types of activated carbon may be employed in a series of steps including a desorption step for the separation of paraxylene from its isomers, meta and ortho xylene. My invention does not require that a solvent be used to introduce the mixture of xylenes to the activated carbon bed, but certain solvents may be used to improve the selectivity for paraxylene. Desorption is preferably carried out by a displacing material which is slightly more strongly or slightly less strongly adsorbed by activated carbon surfaces.

The critical dimension of a molecule is important in molecular sieve adsorption technology. The critical dimension may be thought of as the largest dimension of a cross section of the molecule. Thus, the critical dimension of methane is roughly the same as the critical dimension of normal pentene. A molecule's critical dimension for a circular pore opening is normally its second largest dimension (i.e., the largest dimension of a cross section); for a slit or generally rectangular opening, two dimensions must be considered.

With respect to xylene isomers, the larger of the two smallest dimensions is the controlling one. Thus, while all xylene isomers have a smallest dimension of about 3.3 angstroms, they vary as to the next greatest dimension, as follows: para, 6.7; meta, 7.1; and ortho, 7.4.

Therefore, the critical dimension of the pore opening, to adsorb the para form and exclude the ortho and meta, is about 7.0 angstroms. Assuming a rectangular or slot-shaped pore opening, it should have a "height" of from 3.3 angstroms to about 7.0 angstroms and a "width" of from 6.7 up to 7.0 angstroms. That is, the critical dimension of the average pore opening should be no greater than about 7.0. As a practical matter when referring to a substantial quantity of activated carbon it may be that a large part of its does not have the desired pore opening. However, if a substantial portion of the activated carbon, i.e., about 5 percent or more, has the desired pore opening, practical results may be obtained. The process will, of course, be operable with even less of the desired carbon.

For measuring the pore openings, I particularly prefer to use the "molecular sieve" activated carbon made by the methods disclosed and claimed in Richard J. Grant's U.S. Pat. No. application Ser. No. 132,217, and George R. Stoneburner's U.S. Pat. No. application Ser. No. 132,216, both entitled "Controlled Selectivity Activated Carbon," both of which were filed on Apr. 7, 1971, and both of which are incorporated herein by reference.

Activated carbon has several distinct advantages in my invention over a crystalline molecular sieve. The presence of water is not harmful to carbon; in fact, steam can be used for desorption. Sulfur or nitrogen compounds are not known to interfere with adsorption or desorption. The choice of solvents and desorbents is relatively broad because of the chemical inertness of the carbon.

The following series of tests were performed to demonstrate the invention.

EXAMPLE 1

Preliminary tests were carried out using a 50/50 mixture of ortho and para xylene as a test liquid. This mixture was pumped through a 175 cubic centimeter bed of "MSC-V" molecular sieve activated carbon at a flow of 3 cubic centimeters per minute and a temperature of 600°F. The first liquid to issue from the column contained only 30 percent paraxylene, but breakthrough was rapid and complete breakthrough was observed two minutes later. Steam desorption of the saturated carbon produced a mixture containing 55 percent paraxylene. An experimental molecular screen carbon known as 14-70-83 was also tested under similar conditions. In the breakthrough test the first raffinate contained 30 percent paraxylene but complete breakthrough did not occur until 6 minutes later. Steam desorbate contained 65 percent paraxylene.

EXAMPLE 2

In experiments conducted in liquid phase at room temperature, a 50/50 ortho and para xylene mixture was pumped downflow into a 100 cubic centimeter bed of "MSC-V" molecular sieve activated carbon at a flow of 2 cubic centimeters per minute. The first material from the column contained 36 percent paraxylene, again showing separation of the xylenes. After 10 minutes the effluent contained 47 percent paraxylene. Interestingly, a sample of Pittsburgh-type "BPL" activated carbon (14 × 40) which was tested for comparison made a separation in the opposite direction. First effluent from the "BPL" bed contained 55 percent paraxylene.

EXAMPLE 3

To further explore the ability of molecular screen carbons to make xylene separations another test mixture was employed. This mixture contained 8 percent ethyl benzene, 22 percent orthoxylene, 22 percent paraxylene, and 48 percent metaxylene. Both "MSC-V" and the experimental molecular screen carbon were again tested in vapor phase. AT 600°F first effluent from the "MSC-V" carbon contained only 15.4 percent paraxylene and an increase in other components, illustrating preferential adsorption of paraxylene. Complete breakthrough of paraxylene was observed after another 4 or 5 minutes. Steam desorbate contained 25 percent paraxylene, an increase of 3 percent. The experimental molecular screen carbon showed greater selectivity for paraxylene. First effluent in the breakthrough test contained only 3 percent paraxylene and complete breakthrough was not observed for another 15 minutes. Both "MSC-V" carbon and the experimental molecular screen carbon were subjected to a series of adsorption/steam desorption cycles. On a 10 minutes cycle (5 minutes adsorption, 5 minutes desorption) desorbates from the "MSC-V" carbon bed averaged 25 percent paraxylene and desorbate volumes were one-third of the total influent volume. The experimental molecular screen carbon again gave better results. Here raffinates averaged 20 percent paraxylene and desorbates averaged 29 percent paraxylene.

In the above tests the activated carbons described as "MSC-V" and as "experimental carbon 14-70-83" have the following characteristics:

|  | Apparent Density gm/cc | I$_2$ No. | CCl$_4$ No. | Size |
| --- | --- | --- | --- | --- |
| MSC-V | .73 | 449 | 0.26 | 14×40 |
| 14-70-83 | .710 | 477 | .505 | 12×40 |

Tests have also been run to determine the effects of solvents on the selectivity. Virtually any solvent or combination of solvents for xylene may be used. In these tests, selectivity is defined as the weight ratio of two components in the solid phase (absorbent-free) over the weight ratio of the same two components in the liquid phase.

$$\alpha\, p, m = X_p/X_m \; Y_p/Y_m$$

where $X_p$, $X_m$ = Concentration in solid phase, para and meta isomers $Y_p$, $Y_m$ = Concentration in liquid phase, para and meta isomers The effects were shown by immersing "MSC-V" activated carbon in a breaker of the solutions shown in Table I with occasional agitation. The weight ratio of "MSC-V" carbon to total xylenes was approximately 2:1 where solvents were used. Initial and final solution analyses at equilibrium were used to determine the concentrations in the solid phase.

TABLE I

Effect of Solvent on Selectivity

| System | Selectivity ($\alpha$ p,m)* |
|---|---|
| 10% xylene in Tetralin | 2.6 |
| 20% xylene in iso-octane | 2.3 |
| 10% xylene in isobutanol | 1.6 |
| 20% xylene in pseudocumene | 3.7 |
| 10% xylene in n-hexane | 1.5 |
| 10% xylene in benzene | Preferential Adsorption of Solvent |
| 20% xylene in toluene | Preferential Adsorption of Solvent |
| $C_8$ Stream (No Solvent) | 1.1 |

*As above. The selectivity of paraxylene over orthoxylene is greater.

Desorption may be accomplished by steam, by the compound used as a solvent, or a desorbent different from the solvent. In the desorption step, the first product to emit from the bed may be refluxed to feed. When the concentration of paraxylene with respect to ortho and meta xylene has risen to an acceptable level, the product stream is directed to a desorbent/paraxylene separation step. Percentage of paraxylene with respect to all forms of xylene in the adsorbate increases as the xylene is removed from the activated carbon; however, in a static system the concentration of xylene in the solvent will decrease rapidly. Preferred solvents are pseudocumene, isobutanol, iso-octane, tetralin, n-hexane, and carbon disulfide.

1. Method of separating a mixture of xylene isomers into a raffinate and a paraxylene-enriched product by preferential adsorption of paraxylene comprising contacting the mixture of xylene isomers with molecular sieve activated carbon having generally rectangular pore openings whose dimensions are from 3.3 to about 7.0 angstroms by from 6.7 to about 7.0 angstroms, to adsorb a paraxylene-enriched adsorbate, and recovering the adsorbate from the said molecular sieve activated carbon.

2. Method of claim 1 in which the adsorbate is recovered by a steam treatment.

3. Method of claim 1 in which the adsorbate is recovered by displacement by a displacing agent selected from the group consisting of pseudocumene, iso-octane, iso-butanol, tetrahydronaphthalene, n-hexane, and carbon disulfide.

* * * * *